Figure 1:
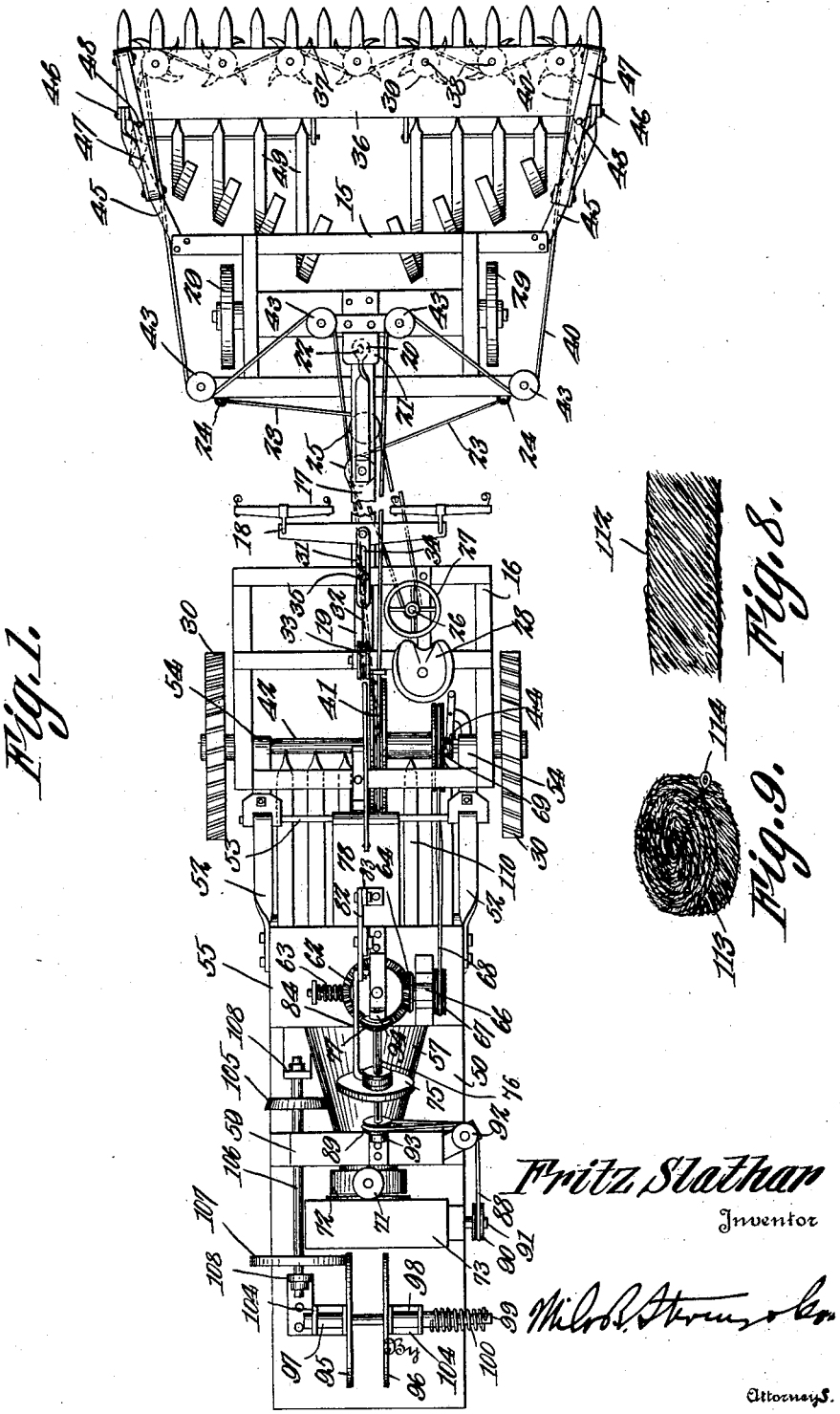

F. SLATHAR.
METHOD OF AND APPARATUS FOR HARVESTING FODDER CROPS.
APPLICATION FILED NOV. 5, 1915.

1,213,284. Patented Jan. 23, 1917.

F. SLATHAR.
METHOD OF AND APPARATUS FOR HARVESTING FODDER CROPS.
APPLICATION FILED NOV. 5, 1915.

1,213,284.

Patented Jan. 23, 1917.
5 SHEETS—SHEET 2.

Inventor
Fritz Slathar

By

Attorneys

F. SLATHAR.
METHOD OF AND APPARATUS FOR HARVESTING FODDER CROPS.
APPLICATION FILED NOV. 5, 1915.

1,213,284. Patented Jan. 23, 1917.
5 SHEETS—SHEET 4.

Fritz Slathar
Inventor,

By *[signature]*
Attorneys

F. SLATHAR.
METHOD OF AND APPARATUS FOR HARVESTING FODDER CROPS.
APPLICATION FILED NOV. 5, 1915.
1,213,284.
Patented Jan. 23, 1917.
5 SHEETS—SHEET 5.
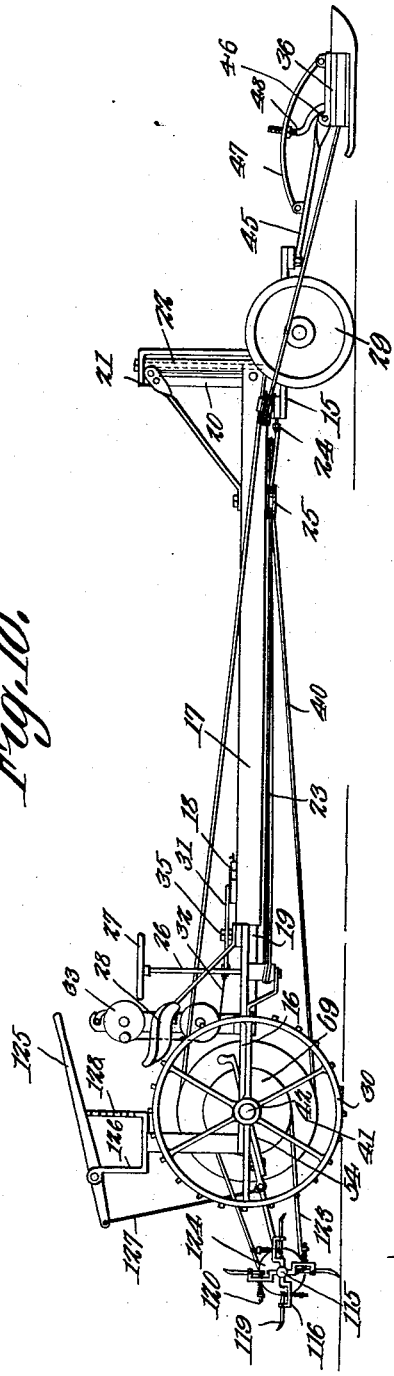
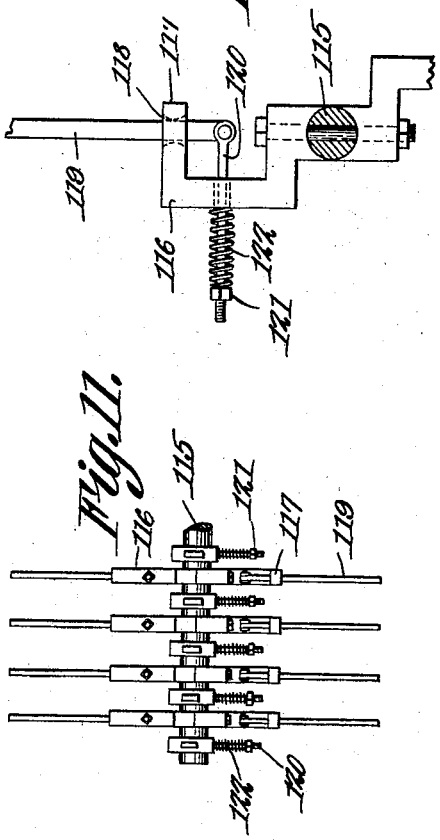
Fritz Slathar
Inventor

UNITED STATES PATENT OFFICE.

FRITZ SLATHAR, OF BLOOM CITY, WISCONSIN.

METHOD OF AND APPARATUS FOR HARVESTING FODDER-CROPS.

1,213,284. Specification of Letters Patent. Patented Jan. 23, 1917.

Application filed November 5, 1915. Serial No. 59,777.

*To all whom it may concern:*

Be it known that I, FRITZ SLATHAR, citizen of the United States, residing at Bloom City, in the county of Richland and State of Wisconsin, have invented new and useful Improvements in Methods of and Apparatus for Harvesting Fodder-Crops, of which the following is a specification.

The present method of leaving fodder crops in the field until dry or cured results in great loss from the crop being damaged or spoiled by bad weather, and in order to prevent this waste and loss, I have devised a method whereby the crop may be harvested and stored in a barn or other shelter where it will not be affected by unfavorable weather conditions, and left there to dry and cure.

In carrying out the invention, I provide a combined mower and baler, the latter running behind the mower. The grass or other crop cut by the mower is placed in a windrow, and picked up by the baler, the latter being constructed to roll the grass into a flat rope-like form. This rope of grass is formed into bales by coiling the same, and the bales thus formed are then placed in the barn or other shelter to cure. The bales are arranged in piles by being laid flat, one on top of the other, so that the center openings in the bales are in alinement. This arrangement gives a ventilating space through the center of the pile of bales, and as the bales are circular there is also left considerable ventilating space around each pile. By this form of bales, and method of piling the same in the barn, the crop will dry and cure perfectly without danger of spoiling.

The invention also contemplates a novel and improved mower structure and baling attachment which is removable from the mower, so that the latter may be used with a tedder attachment if the crop is to be left in the field to dry and cure.

A further object of the invention is to provide a tedder having a novel form of yielding teeth, so that they may clear obstructions without danger of breaking.

In order that the invention may be better understood, reference is had to the accompanying drawings, in which—

Figure 2:
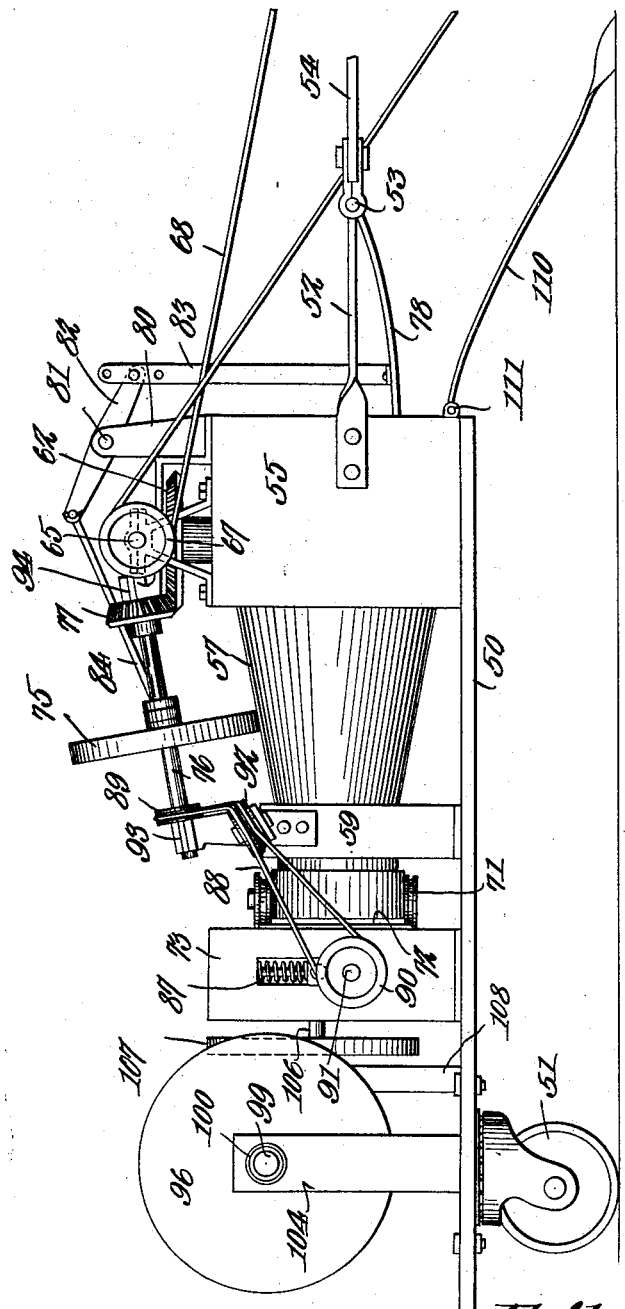
Figure 3:
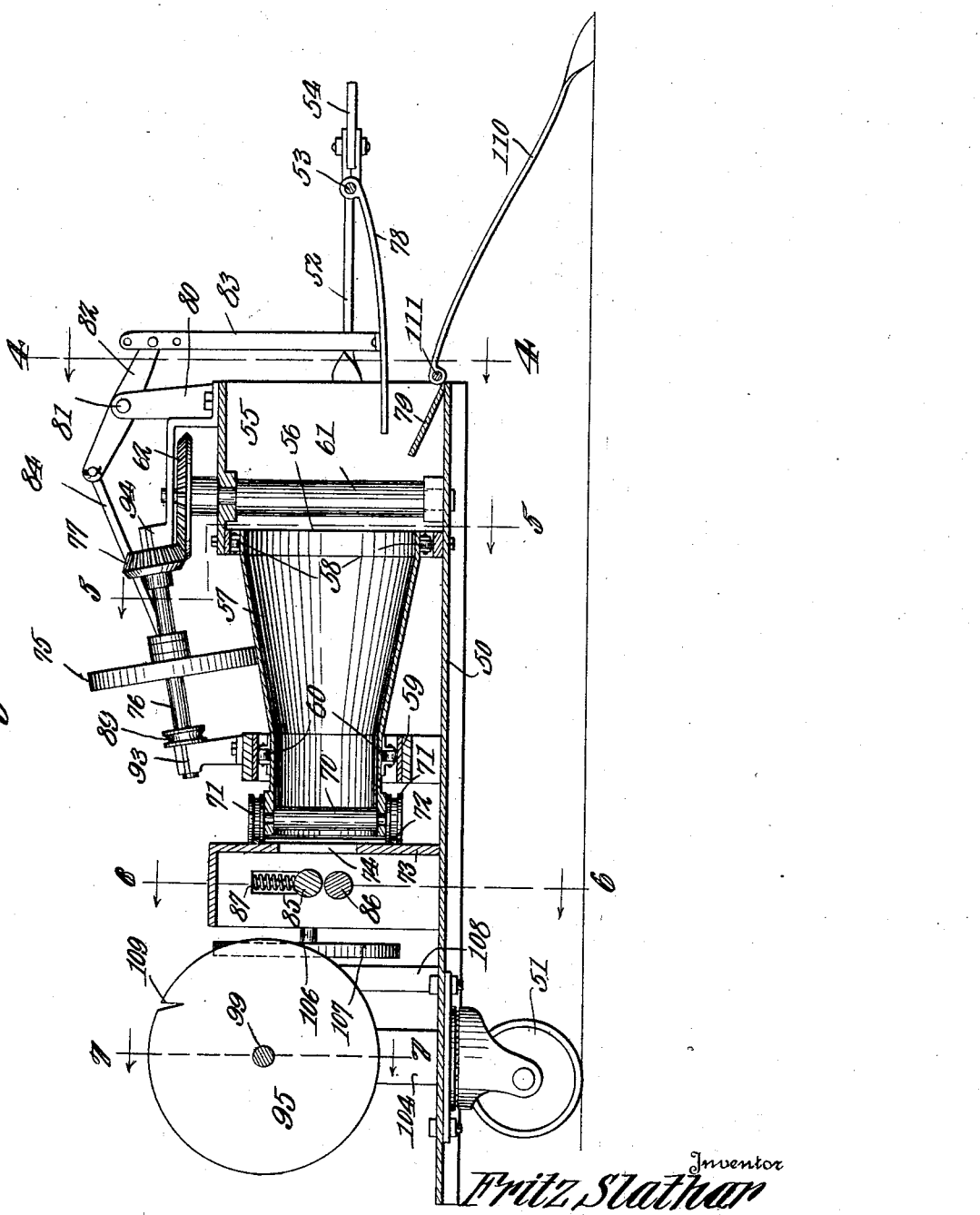
Figure 4:
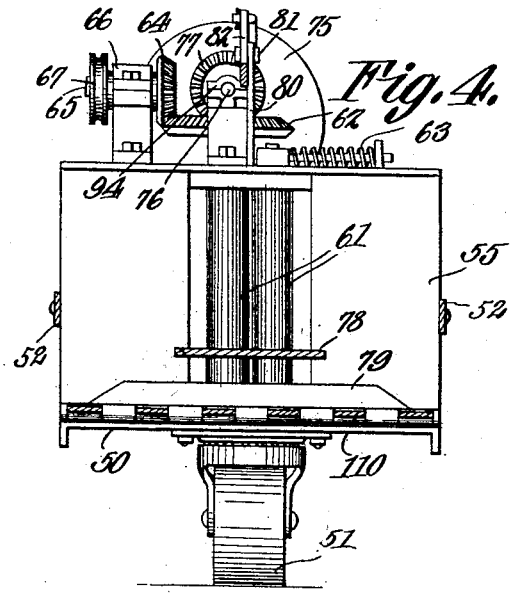
Figure 5:
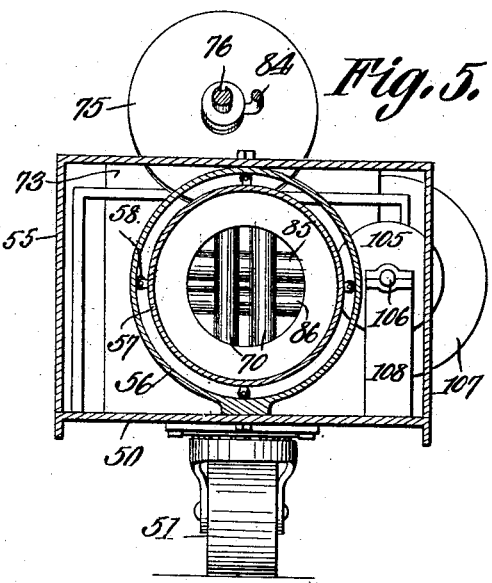
Figure 6:
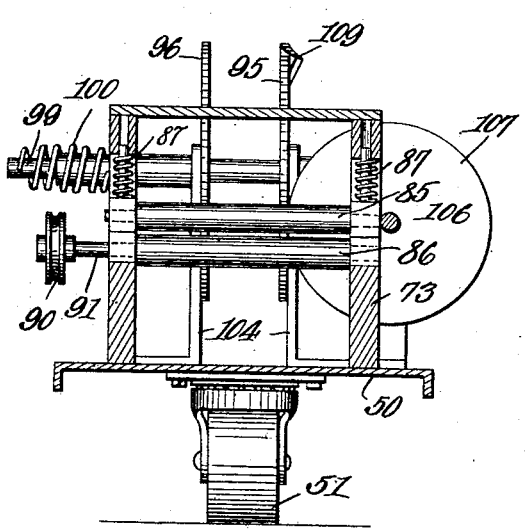
Figure 7:
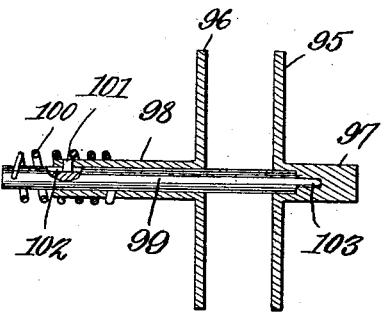

Figure 1 is a plan view showing the combined mowing machine and baler; Fig. 2 is a side elevation of the baler; Fig. 3 is a central longitudinal section of the baler; Figs. 4, 5, 6 and 7 are cross-sections on the lines 4—4, 5—5, 6—6 and 7—7, respectively, of Fig. 3; Fig. 8 is a plan view of a fragment of the rope of grass, and Fig. 9 is a perspective view of the same coiled to form the finished bale; Fig. 10 is a side elevation of the mower provided with a tedder attachment; Fig. 11 is an elevation of a fragment of the tedder, and Fig. 12 is a detail showing the mounting of the tedder teeth.

Referring specifically to the drawings, the frame of the mower comprises front and rear trucks 15 and 16, respectively, connected by an adjustable coupling pole 17 carrying a draft tree 18 for the draft animals, the spacing of the trucks being such that the draft animals may walk therebetween, behind the front truck. The coupling pole 17 telescopes over a coupling pole section 19 fixed to and extending forward from the rear truck, suitable means being provided for locking the parts in adjusted position. The adjustment of the coupling pole enables the same to be lengthened or shortened to vary the distance between the trucks.

The front truck 15 has a swiveled connection with the forward end of the coupling pole 17, so that it may be swung sidewise to steer the machine. This connection is made by a vertical hinge knuckle 20 on the front end of the coupling pole and a bracket 21 on the front truck, with a hinge pin 22 passing through said knuckle and bracket. The machine is steered by hauling lines 23 connected to opposite sides of the front truck 15 as indicated at 24, from which they extend inward, and after crossing and passing over guide pulleys 25 carried by the coupling pole 17, the lines extend rearward to a suitable winding device 26 mounted on the rear truck 16, and having an operating handle 27 located adjacent to the driver's seat 28, the latter being also mounted on the rear truck.

The front truck 15 is mounted on wheels 29, and the rear truck is mounted on wheels 30, which latter also serve as the driving wheels of the cutting and baling mechanism. The draft tree 18 is carried by a strap 31 which is adjustable lengthwise on the coupling pole 17 by a hauling line 32 connected to a small drum or pulley 33 mounted on the rear truck 16. The strap 31 has a longitudinal slot 34 to permit the adjustment described, the fastening 35 which secures the strap to the coupling pole passing through this slot.

The front truck 15, in advance thereof, carries a finger bar 36, the same being armed with rotary cutters 37 mounted on vertical spindles 38 carried by the finger bar. On the spindles 38 are pulleys 39. An endless line 40 passes over these pulleys in front of one and behind the next adjacent one, and so on throughout the entire series. Thus it will be seen that when the line is traveling, the cutters will be operated. The line 40 extends rearward and is trained over a grooved drive pulley 41 mounted on the axle 42 of the rear truck 16. On the front truck 15 are suitably positioned guide pulleys 43 for the line 40. A clutch device 44 will be provided for operatively connecting the pulley 41 to the axle 42, the latter being driven from the wheels 30.

The finger bars carried by bracket arms 45 secured to the front truck 15 and extending forwardly therefrom, to the outer ends of which bracket arms the finger bar is pivotally connected, as indicated at 46, so that it may swing in a vertical plane to follow the irregularities of the ground. A bowed spring 47 extends between the finger bar and the bracket arm 45 at each end and holds the latter yieldingly in contact with the ground. Screw stems 48 extending upward from the finger bar and passing through the spring 47, intermediate the ends thereof, are employed for adjusting the tension of the spring.

Behind the finger bar 36 is mounted a wind-rower attachment 49 arranged in the usual manner to carry the cut grass to the center, and to leave the same in a row.

The baling attachment trails behind the mowing machine, said attachment being mounted on a wheeled platform 50. This platform is supported at its rear end on a caster wheel 51, and at its forward end it has draw bars 52 which are connected to a rod 53 carried by bracket members 54 loosely mounted on the axle 42 and extending rearwardly therefrom, said brackets being loosely mounted so that they may swing up and down and enable the baling attachment to ride over uneven ground.

At the front end of the platform 50 is mounted a housing 55 which is open in front and has at its rear end a circular opening 56 in which is mounted the larger end of a conical drum 57, the same being set horizontally. The drum 57 is rotatable, and its larger end seats in the opening 56, it being here provided with anti-friction rollers 58. The smaller forward end of the member 57 seats in a bearing support 59 and is here also provided with anti-friction rollers 60.

The housing 55 is stationary and contains a pair of upright rollers 61 set close together and located adjacent to the large receiving end of the drum 57. The rollers are journaled in the top and bottom of the housing and on the upper end of one of the rollers 61 is fast a bevel gear 62, whereby said roller is driven through a gearing to be presently described. The other roller 61 is idle and is yieldingly supported, a spring 63 being employed for pressing the same toward the driven roller. The function of the rollers 61 is to feed the grass to be baled forward through the drum 57, as will be presently described.

In mesh with the bevel gear 62 is a bevel gear 64 fast on a shaft 65 supported in a bearing 66 mounted on top of the housing 55 and having a pulley 67 which is connected by a belt 68 to a pulley 69 on the axle 42, whereby the feed rollers 61 are driven. The other parts of the baling mechanism are also driven from the axle 42 as will be described hereinafter.

In the rear end of the drum 57 are mounted two twisting rollers 70 set close together and extending in parallelism across the drum. These rollers are journaled in the wall of the drum and on the outside thereof the shafts of the rollers have friction wheels 71 which are in engagement with a circular friction surface 72 on the wall 73 located behind the rear end of the drum 57, this end of the drum being open, and the wall 73 having an opening 74 in front of which the twisting rollers are located. Thus, the grass as it leaves the rollers 70 passes through the opening 74. The rollers 70 are driven through the friction wheels 71 when the drum 57 is rotated as they revolve with the drum.

The drum 57 is driven by means of a friction wheel 75 engaging the outer surface thereof, said friction wheel being on a shaft 76 which is driven from the bevel gear 62 by means of a bevel gear 77. The friction wheel 75 is slidable on the shaft 76 so that it may be shifted along the conical surface of the drum 57, whereby a variable-speed drive is obtained. The speed is automatically regulated by the quantity of grass entering the housing 55, through the following means: Into the housing extends a blade 78 which is hinged on the rod 53 to swing in a vertical plane, the blade extending rearward from the rod and terminating at its rear end in the housing a sufficient distance from the bottom thereof to enable the grass to pass under the blade to the feed rollers 61. From the bottom of the housing 55 also rises a deflector plate 79 which is inclined upward toward the feed rollers, and above which the blade 78 is located. On top of the housing 55 is mounted a support 80 to which is fulcrumed, as indicated at 81, a lever 82. One end of this lever is connected by a pitman 83 to the blade 78, the connection being an adjustable one so that the blade may be raised or lowered. The other end of the lever is connected by a pitman 84 to the friction wheel 75. Thus, it will be seen that when the lever 82 is swung, the friction wheel 75 will be slid on the shaft 76 and thus shifted on the drum 57 to vary the speed at which said drum is rotated. When an abnormal quantity of grass passes under the blade 78, it pushes the same upward, whereupon, through the pitman 83, the lever 82, and the pitman 84, the friction wheel 75 is shifted toward the smaller end of the drum 57, thereby increasing the speed of the latter so that the baling mechanism operates faster to take care of the greater supply of grass which is entering the apparatus. When the supply is again normal, the blade 78 swings down, whereupon the friction wheel 75 is carried toward the larger end of the drum 57, and the speed is correspondingly reduced.

The wall 73 supports rollers 85 and 86, respectively, extending horizontally and in parallelism in front of the opening 74 and transversely thereof. The top roller 85 is spring-pressed toward the bottom roller 86, the spring being indicated at 87. The roller 85 is idle, and the roller 86 is driven from the shaft 76 by means of a belt 88 passing over a pulley 89 on the shaft 76 and a pulley 90 on the shaft 91 of the roller 86, the bearing stand or support 59 carrying a guide pulley 92 for the belt. One end of the shaft 76 is supported in a bearing 93 on the stand 59, and the other end of said shaft is supported in a bearing 94 carried by the top of the housing 55.

Behind the rollers 85 and 86 is mounted a spool on which the rope of grass is wound into a coil. The spool is composed of end plates 95 and 96, respectively. The plate 95 has a hub 97, and the plate 96 has a hub 98. Through the hub 98 passes a shaft 99 which also extends into the hub 97, whereby the plates 95 and 96 are connected in spaced relation with the shaft 99 extending therebetween, so that the rope of grass may be wound thereon between the plates. The shaft 99 is slidable so that it may be withdrawn from the hub 97 and from the space between the plates 95 and 96, in order to release the finished bale. A spring 100 connected to the shaft holds the same advanced to connect the plates 95 and 96. Upon retracting the shaft, the spring is placed under tension, and when the shaft is released it is carried forward to again connect the plates. The plate 96 is prevented from turning on the shaft 99 by a pin 101 passing through the hub 98 and seating in a longitudinal slot 102 in the shaft, and the plate 95 is prevented from turning on the shaft by forming the opening in the hub 97 with a squared portion 103 in which a corresponding end portion of the shaft 99 seats. Thus, it will be seen that the shaft 99 and the parts 95 and 96 turn as one. On the platform are bearing stands 104 in which are journaled the hubs 97 and 98.

The spool hereinbefore described is driven from the drum 57, a friction gearing being employed, the same comprising a friction wheel 105 in contact with the drum 57 and mounted on the shaft 106, said shaft also carrying a friction wheel 107 which is in contact with the outer face of the spool plate 95. The shaft is supported in bearings 108 carried by the platform 50.

The spool plate 95 has a peripheral notch 109 to which the end of the rope of grass is attached preparatory to winding the same on the spool.

From the front end of the platform 50 extend rake fingers 110 for gathering the grass and conveying the same into the housing 55. These gathering fingers are pivoted to the front end of the platform as indicated at 111, and they extend forward and downward to the ground.

The operation of the apparatus may be summarized as follows: The mowing machine cuts the grass, and the latter is raked into a row by the wind-rower 49. The fingers 110 pick up the row of grass and convey the same into the housing 55, the grass being fed by the forward movement of the machine. The rollers 61 seize the grass and feed it rearward through the drum 57 to the rollers 70, and after passing between the last-mentioned rollers, the grass passes through the opening 74 and between the rollers 85 and 86. Inasmuch as the rollers 70 rotate about their own axes and also revolve bodily with the drum 57 about an axis coinciding with the longitudinal center of said drum, it will be seen that the grass is twisted and pulled forward by said rollers. The grass is therefore twisted into a rope-like form and after passing the rollers 70 it is drawn forward by the rollers 85 and 86 and wound on the shaft 99 of the spool, the end of the rope being hooked into the notch 109 of the spool plate 95. When the coil of grass fills the spool, the shaft 99 is retracted to discharge the coil, after severing the oncoming rope of grass from the finished coil or bale. The grass is then again attached to the spool and the next coil is formed. The finished bales are then hauled to the barn or other shelter and stored away, but if the weather is favorable, the bales may be left in the field to partly dry and cure.

The mechanism hereinbefore described forms the grass into a flat rope-like form as shown at 112 in Fig. 8, and winds the same into a spiral coil forming a flat, substantially circular bale as shown at 113 in Fig. 9, said bale having a central opening. The convolutions of the coil may be fastened together by a pin 114. The rollers 85 and 86 are set to squeeze the rope of grass flat and to crush the strands just enough to open up the same, but not enough to squeeze out the sap. This results in the better drying and curing of the grass.

The bales are piled one on top of the other so that the central openings are in alinement, thereby leaving a ventilating space throughout the pile of bales, and as the bales are substantially circular there will be a ventilating space practically all around the bales as they are placed side by side in the barn or other shelter. This method of baling the grass and storing the same enables the grass to be cured and dried in the barn, thus eliminating the damage and resultant loss where the grass is left in the field to dry and cure.

The machine may be operated by draft animals, or it may be power driven.

Figs. 10 to 12 illustrate a tedder attachment which is used when the grass is to be left in the field to cure and dry. This attachment is mounted on the axle 42 and comprises a shaft 115 carrying radial arms 116 having laterally extending extremities 117 provided with openings 118 in which are mounted, so as to be free to swing back and forth therein, tedder teeth 119. To the inner end of each tedder tooth is connected a stem 120 which passes through the arm 116 and has an abutment 121 between which latter and the arm is a spring 122. This construction provides a yielding support for the tedder teeth so that they may swing to clear obstructions. The tedder shaft 115 is supported from the axle 42 by means of the bracket members 54 and is driven from the pulley 69 by means of a belt 123 passing over said pulley, and a pulley 124 on the tedder shaft. The tedder attachment may be raised and lowered by means of a lever 125 fulcrumed to a suitable support 126 mounted on the truck 16 and having a connection 127 with the bracket members 54. A suitable lock 128 for locking the lever 125 is provided.

I claim:

1. The method of preparing grass, preliminary to drying the same for use as fodder, consisting in twisting the freshly cut grass into a rope-like form, and then winding the rope of grass into separate coils to form bales.

2. The method of preparing grass, preliminary to drying the same for use as fodder, consisting in twisting the freshly cut grass into rope-like form, subjecting the rope of grass to sufficient pressure to crush the strands without squeezing out the sap, and then winding the rope of grass into separate coils to form bales.

3. The method of preparing grass, preliminary to drying the same for use as fodder, consisting in twisting the grass into rope-like form after it is cut, and then winding the rope of grass into separate coils to form flat bales having a central ventilating space.

4. A baler for twisting material into a rope-like form and winding the rope into a coil, comprising a rotatable drum open at its ends, feed rollers mounted adjacent to the receiving end of the drum, twisting rollers mounted in the drum, said twisting rollers being rotatable about their own axes and revolving with the drum, and driving means for the drum, and the feed and twisting rollers.

5. A baler for twisting material into a rope-like form and winding the rope into a coil, comprising a rotatable drum open at its ends, twisting rollers mounted in the drum, said twisting rollers being rotatable about their own axes and revolving with the drum, and driving means for the drum and the twisting rollers.

6. A baler for twisting material into a rope-like form and winding the rope into a coil, comprising a rotatable drum open at its ends, means for feeding material into the drum, twisting rollers mounted in the drum, said twisting rollers being rotatable about their own axes and revolving with the drum, and driving means for the drum and the twisting rollers.

7. A baler for twisting material into a rope-like form and winding the rope into a coil, comprising a rotatable drum open at its ends, means for feeding material into the drum, twisting rollers mounted in the drum, said twisting rollers being rotatable about their own axes and revolving with the drum, a spool on which the twisted material is wound, and driving means for the drum, the twisting rollers and the spool.

8. A baler for twisting material into a rope-like form and winding the rope into a coil, comprising a rotatable drum open at its ends, means for feeding material into the drum, twisting rollers mounted in the drum, said twisting rollers being rotatable about their own axes and revolving with the drum, a spool on which the twisted material is wound, crushing rollers between the twisting rollers and the spool, between which crushing rollers the twisted material passes, and driving means for the drum, the twisting rollers, the spool, and the crushing rollers.

9. A baler for twisting material into a rope-like form and winding the rope into a coil, comprising a rotatable drum open at its ends, twisting rollers mounted in the drum, said twisting rollers being rotatable about their own axes and revolving with the drum, crushing rollers between which the twisted material passes, means for forming the crushed material into a coil, and driving means for the drum, the twisting rollers, the crushing rollers, and the coil-forming means.

10. A baler for twisting material into a rope-like form and winding the rope into a coil, comprising a rotatable drum open at its ends, twisting rollers mounted in the drum, said twisting rollers being rotatable about their own axes and revolving with the drum, crushing rollers between which the twisted material passes, and driving means for the drum, the twisting rollers, and the crushing rollers.

11. A baler for twisting material into a rope-like form and winding the rope into a coil, comprising a rotatable drum of conical form open at its ends, means for feeding material into the drum, a friction wheel engageable with the drum for driving the same and movable along the drum for varying its speed, a movable speed-governing member at the entrance end of the drum and in the path of the material, an operating connection between said member and the friction wheel for shifting the same, twisting rollers mounted in the drum, said twisting rollers being rotatable about their own axes and revolving with the drum, and driving means for the twisting rollers.

12. A baler for twisting material into a rope-like form and winding the rope into a coil, comprising a rotatable drum of conical form open at its ends, a friction wheel engageable with the drum for driving the same and movable along the drum for varying its speed, a movable speed-governing member at the entrance end of the drum and in the path of the material, an operating connection between said member and the friction wheel for shifting the same, twisting rollers mounted in the drum, said twisting rollers being rotatable about their own axes and revolving with the drum, driving means for the twisting rollers, and feed rollers mounted adjacent to the receiving end of the drum and geared to the friction wheel.

13. A baler for twisting material into a rope-like form and winding the rope into a coil, comprising a rotatable drum open at its ends, means for feeding material into the drum, twisting rollers mounted in the drum, said twisting rollers being rotatable about their own axes and revolving with the drum, friction wheels on the ends of the twisting rollers, a stationary surface engageable by the friction wheels, and driving means for the drum.

14. A baler for twisting material into a rope-like form and winding the rope into a coil, comprising a rotatable drum open at its ends, means for feeding material into the drum, twisting rollers mounted in the drum, said twisting rollers being rotatable about their own axes and revolving with the drum, friction wheels on the ends of the twisting rollers, a stationary surface engageable by the friction wheels, a friction wheel engageable with the drum for driving the same, and movable along the drum for varying its speed, and means governed by the material entering the drum for shifting the friction wheel.

15. A baler for twisting material into a rope-like form and winding the rope into a coil, comprising a rotatable drum open at its ends, means for feeding material into the drum, twisting rollers mounted in the drum, said rollers being rotatable about their own axes and revolving with the drum, means for driving the drum and the twisting rollers, and a speed-governing device for said driving means controlled by the material entering the drum.

16. A baler for twisting material into a rope-like form and winding the rope into a coil, comprising a rotatable drum open at its ends, means for feeding material into the drum, twisting rollers mounted in the drum, said rollers being rotatable about their own axes and revolving with the drum, a spool on which the twisted material is wound, said spool comprising a shaft and spaced plates mounted on the shaft, said shaft being movable from between the plates to release the coil, and driving means for the drum, the twisting rollers, and the spool.

17. A baler for twisting material into a rope-like form and winding the rope into a coil, comprising a rotatable drum open at its ends, means for feeding material into the drum, twisting rollers mounted in the drum, said rollers being rotatable about their own axes and revolving with the drum, a spool on which the twisted material is wound, said spool comprising a shaft and spaced plates mounted on the shaft, said shaft being movable from between the plates to release the coil, a friction wheel engageable with the drum for driving the same, a shaft carrying the friction wheel, a countershaft, friction wheels on said countershaft, one of said friction wheels being in contact with the drum and the other friction wheel being in driving contact with one of the end plates of the spool.

18. A baler for twisting material into a rope-like form and winding the rope into a coil, comprising a rotatable drum open at its ends, means for feeding material into the drum, twisting rollers mounted in the drum, said rollers being rotatable about their own axes and revolving with the drum, a friction wheel engageable with the drum for driving the same, a shaft carrying the friction wheel, crushing rollers between which the twisted material passes, and a driving connection between the crushing rollers and the aforesaid friction wheel shaft.

19. A baler for twisting material into a rope-like form and winding the rope into a coil, comprising a rotatable drum open at its ends, means for feeding material into the drum, twisting rollers mounted in the drum, said rollers being rotatable about their own axes and revolving with the drum, a friction wheel engageable with the drum for driving the same, a shaft carrying the friction wheel, crushing rollers between which the twisted material passes, a driving connection between the crushing rollers and the aforesaid friction wheel shaft, and means governed by the material entering the drum for shifting the friction wheel along the drum to vary the speed thereof.

In testimony whereof I affix my signature.

FRITZ SLATHAR.

Copies of this patent may be obtained for five cents each, by addressing the "Commissioner of Patents, Washington, D. C."